Figure 1:
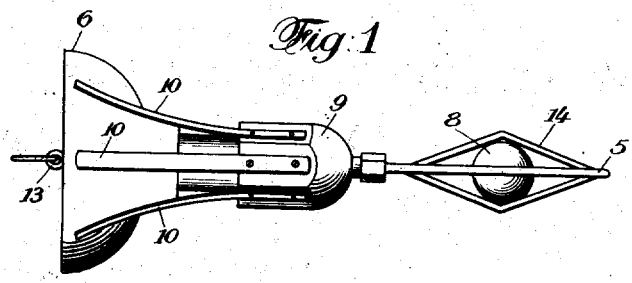

H. A. GREENAN.

DEVICE FOR PASSING CABLES THROUGH PIPE LINES.

APPLICATION FILED AUG. 3, 1909.

Reissued Nov. 2, 1909. 13,032.

H. A. Greenan

Inventor

Witnesses:

Wallace Greene

Wm. M. Berry

By his Attorneys Kenyon & Kenyon

UNITED STATES PATENT OFFICE.

HUGH A. GREENAN, OF RICHMOND, NEW YORK, ASSIGNOR TO NATIONAL WATER MAIN CLEANING COMPANY, OF NEW YORK, N. Y., A CORPORATION OF MAINE.

DEVICE FOR PASSING CABLES THROUGH PIPE-LINES.

13,032. Specification of Reissued Letters Patent. Reissued Nov. 2, 1909.

Original No. 920,455, dated May 4, 1909, Serial No. 347,906. Application for reissue filed August 3, 1909. Serial No. 511,069.

*To all whom it may concern:*

Be it known that I, HUGH A. GREENAN, a citizen of the United States, and a resident of Richmond, county of Richmond, and State of New York, have invented certain new and useful Improvements in Devices for Passing Cables Through Pipe-Lines, of which the following is a specification.

This invention relates to devices for pulling cables through pipe lines and has in view the prevention of the stoppage of such devices through the presence of branch pipes or large obstacles in the bottom of such lines, as will be explained in the following specification and claims and illustrated in the drawings, in which—

Figure 2:
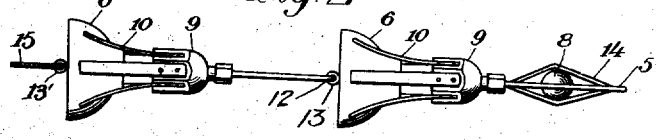
Figure 3:
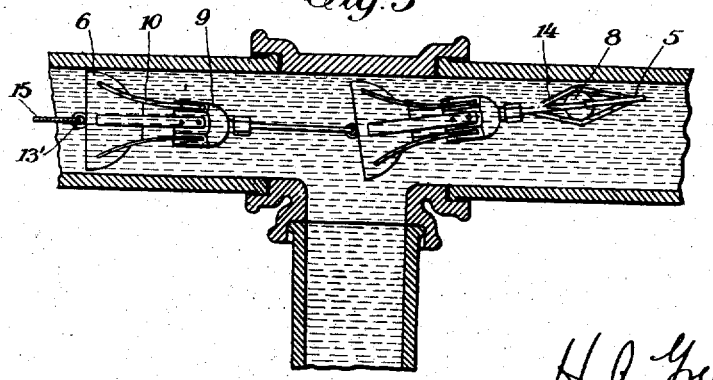

Figure 1 is a side view of the forward part of the device. Fig. 2 is a side view of the complete device. Fig. 3 is a similar view showing the operation of the device in a water main.

In the use of devices of this kind in water mains it has been found that in their progress through the mains they will proceed regularly until a lateral connection is reached, when they will stop owing to the flow of water around the device. Another difficulty has been that the point 5 of the guide 14 while dragging along the bottom of a main will strike against any large object such as a lump of lead, which frequently will be found at the bottom of a pipe, resulting in the stoppage of the device at this point. My improved device will overcome these objections.

In the drawing are shown two cup shaped flexible bodies 6, one having a guide 14 with a point 5. The guide 14 is formed like a cage and incloses a hollow ball or float, 8, made of metal or other material so that when the forward cup is in the main, the cage with the inclosed float will float on the water contained in the pipe line along the top of said pipe line thereby avoiding or clearing any ordinary obstruction that may be found at the bottom of the line. The cage, 14, is attached to a head 9 by means of a stout rod of iron or steel. To the head 9 are also attached a cup 6 and flat springs 10, the latter being used to increase the strength and resiliency of the cup. The rear cup 6 is similar to the forward one except that the guide is dispensed with. From the head 9 of the forward cup 6 extends rearwardly a rod having an eye 13 which engages a similar eye 12 carried by the rear cup, the connection being flexible so that the cups may readily pass around projections that may be found in a pipe line. The rear cup carries an eye 13′ to which is attached a cable 15 to be carried through the pipe line, said cable being then used to drag a cleaning device through said line.

In Fig. 3 is shown a cable carrying device at a T joint. At this point the first cup has taken a position where it would stop if only one cup was used. With two cups, however, as shown, the action of the water on the rear cup is sufficient to propel the forward cup beyond the T joint and then, when the rear cup comes opposite the T joint, the action of the water on the forward cup will propel the device. The result is that with the arrangement shown the cable will be carried reliably past any branch pipes that may be encountered during the passage of the cable carrier through the pipe line.

It is evident that the two cups should be separated by a distance at least equal to the diameter of the pipe to be cleaned or the largest diameter of the cup. If a number of propelling cups, greater than two were used, their distance from each other would be of no consequence.

It very often happens that on tightening a joint lead leaks through into a pipe line and will be deposited in the bottom as a lump very frequently of large dimensions. The cable carrier described, on account of its floating pointed guide will readily pass by such and other similar obstructions in the pipe line.

What I claim as new is:

1. In a device for passing cables through water pipes, the combination of a plurality of elastic propelling elements of equal size flexibly connected together adapted to be moved through a pipe line by a flow of liquid and a floating guide rigidly connected to and adapted to move ahead of the propelling element.

2. In a device for passing cables through water pipes, the combination of two elastic propelling cups of equal size flexibly attached at a distance from each other not less than the greatest diameter of the cups and a pointed floating guide rigidly connected to and adapted to move ahead of the propelling cups.

3. In a device for passing cables through water pipes, the combination of two elastic propelling cups of equal size attached at a distance from each other not less than the greatest diameter of the cups, a pointed cage adapted to move ahead of the propelling cups and a float inclosed in the cage.

4. In a device for passing cables through water pipes, a plurality of propelling elements flexibly connected together adapted to be move l through a pipe line by a flow of liquid and a floating guide rigidly secured to the first propelling element and adapted to move ahead of same.

5. A cable carrier comprising the combination of a series of propelling cups flexibly connected together but separated from each other by a substantially unobstructed space.

6. A cable carrier comprising the combination of a series of elastic propelling elements flexibly connected together but separated from each other by a substantially unobstructed space.

7. A cable carrier comprising the combination of a series of elastic propelling elements flexibly connected together but separated from each other by a substantially unobstructed space and a guide rigidly attached to the forward end of the forward element.

8. In a device for passing cables through water pipes, the combination of a plurality of propelling cups attached at a distance from each other, not less than the greatest diameter of the inside of the pipes hrough which the device is to pass, a guide rigidly connected to the first propelling cup and adapted to move ahead thereof.

9. A cable carrier comprising the combination of a series of propelling cups connected together but separated from each other by a substantially unobstructed space.

10. A cable carrier comprising the combination of a series of elastic propelling elements connected together but separated from each other by a substantially unobstructed space.

In testimony whereof I have signed my name to this specification in the presence of two subscribing witnesses.

HUGH A. GREENAN.

Witnesses:
O. B. Mueller,
Van Orton.